Oct. 16, 1923.  
L. D. FOX  
1,470,604

AUTOMOBILE TITLE ABSTRACT AND IDENTIFICATION SYSTEM

Filed Jan. 25, 1923  5 Sheets-Sheet 1

*Fig.1.*

| 2 DESCRIPTION | Page No............ |
|---|---|
| | IDENTIFICATION |

Name..................................

Type............Year............Model............

H. P.............. ..............Ignition............

Carburetor............ ............No. Cyl............

Color Paint..................................

Engine No..................................

License No..................................

Seal..................................

3

(Signature of Photographed Owner)

Witnessed By:

4

For the A. A. & T. G. Co.

5

—1

Photograph of Owner, and of Car Described Opposite.

Inventor  
Lewis D. Fox  
Chas. J. O'Neill

By

Attorney

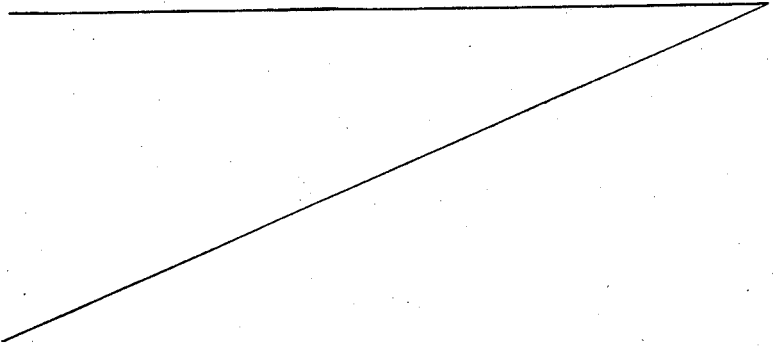

Oct. 16, 1923.  1,470,604
L. D. FOX
AUTOMOBILE TITLE ABSTRACT AND IDENTIFICATION SYSTEM
Filed Jan. 25, 1923    5 Sheets-Sheet 3

*Fig. 3.*

7    CERTIFICATE

Page No............

FOR THE BENEFIT OF..................................................... of.....................................

The AUTOMOBILE ABSTRACT AND TITLE GUARANTY COMPANY hereby certifies that the foregoing Autab contains a complete abstract of all instruments of record in the public records specifically named below of................................................County, State of................................................ affecting the title to that certain Motor Vehicle, description and photograph of which is set out at page.................... of this Autab and made a part hereof.

Our search covers the Chattel Mortgage, Bill of Sale and Laborers Lien Recor

County Courts at Law, District Courts and Justice Courts holden in......................................................County and Federal Tax Liens so far as recorded and indexed in the County Clerk's Office of said County, but does not cover levies or seizures under judicial process out of any Court.

Such information as may be set out in this Autab other than disclosed by the records specifically covered by this certificate is furnished for the benefit of the party named above and no guaranty is made of its accuracy or completeness.

This Autab comprises pages numbered from................to................consecutively, and search covers the period beginning the.................................................... day of..............................................................., and ending the................................................day of..................................................................;

at.............................M.

AUTOMOBILE ABSTRACT AND TITLE GUARANTY COMPANY

By.....................................................................
Secretary.

*Fig. 3ª.*

This is to certify that of................................................
Is the owner of Autab No..................
Covering........................Automobile
License No............Engine No..........
Certified to............................192...
Automobile Abstract & Title Guaranty Co.
By............9'..............................

Inventor
Lewis D Fox
by Chas J O'Neill
Attorney

Oct. 16, 1923.

L. D. FOX 1,470,604

AUTOMOBILE TITLE ABSTRACT AND IDENTIFICATION SYSTEM

Filed Jan. 25, 1923

REGISTRATION RECORD

Page No.................

Dated................................................. License No.................................

In Name of........................................... Seal No.....................................

City of................................................ Engine No..................................

County of.................State of.............. Collector's No..........................

Name of Car....................................... Issued for year..........................

Type...........................H. P................. First Registration (............... )

Year of Model................................... Re-Registration (............... )

Class (1) Passenger (.............), (2) Commercial (..................), Motor Bus (............)

From whom purchased.................................................................... of.................

Address of Owner:..................................Street....................................City State.........

Remarks........................................................................................................

AUTAB No._____ DATE_____

OWNER_____ ADRESS_____

MAKE_____ ENGINE No._____

LICENSE No._____ SEAL No._____ SERIAL No._____

REMARKS_____

PRESENT THIS CARD WITH YOUR CAR AT_____
FOR PHOTO AND SECRET MARKING. AUTAB IS DELAYE UNTIL THIS HAS BEEN DONE.

TO BE FILLED IN BY INSPECTOR_____

PHOTOGRAPH OF M_____ MADE_____

CAR MARKE AS FOLLOWS: CHASSIS_____

BODY_____

DATE_____ INSPECTOR

—15

Inventor
Lewis D. Fox
By Chas J. O'Neill
Attorney

Oct. 16, 1923. 1,470,604
L. D. FOX
AUTOMOBILE TITLE ABSTRACT AND IDENTIFICATION SYSTEM
Filed Jan. 25, 1923    5 Sheets-Sheet 5

*Fig. 5.*

12
INSURANCE RECORD

Page No._____

Data as to Insurance is furnished us by Owner of the Motor Vehicles covered by this AUTAB and no warranty is made as to payment of premium or solvency of Insurance Company.

| No. of Policy | COMPANY | Date Issued | Expires |
|---|---|---|---|
|  |  |  |  |
|  |  |  |  |

| Fire and Theft | Collision | Property Damage | Liability |
|---|---|---|---|
|  |  |  |  |

— 11

13  SECRET IDENTIFICATION RECORD

As additional verification of ownership the insured owner and holder of this AUTAB is protected by a secret mark placed on car. This mark and its location on car is recorded only in our office. It will be furnished without cost to persons entitled to receive same by presenting this AUTAB or by giving the following number:

No. __14__

This Company, unqualifiedly, reserves to itself the sole right to determine who is entitled to receive this secret mark.

Inventor
Lewis D. Fox.
By Chas. J. O'Neill
Attorney

Patented Oct. 16, 1923.

1,470,604

UNITED STATES PATENT OFFICE.

LEWIS D. FOX, OF FORT WORTH, TEXAS.

AUTOMOBILE TITLE ABSTRACT AND IDENTIFICATION SYSTEM.

Application filed January 25, 1923. Serial No. 614,936.

*To all whom it may concern:*

Be it known that I, LEWIS D. FOX, a citizen of the United States, residing at Fort Worth, county of Tarrant, State of Texas have invented certain new and useful Improvements in Automobile Title Abstract and Identification Systems; and I do hereby declare the following to be a full, clear, and exact description of the invention, such as will enable others skilled in the art to which it appertains, to make and use the same.

The invention relates to a novel combination of instrumentalities in the form of blanks having appropriately designated spaces to receive the descriptive data of the machine, a photograph of the car and the owner thereof, the owner's signature, data of record indicating and affecting title to the machine, an index of secret identification marking, a record of the secret marking and the location thereof on the car, memoranda of the sale of the car, data of the registration of the car, and data of the insurance carried including the character and duration thereof and the name or names of the insurers; the particular blanks to be retained by the owner of the car being, preferably, assembled in book form, and the blank relating to the secret marking being retained in possession of the party issuing the book to the owner of the car.

The invention is illustrated in the accompanying drawings, in which,

Fig. 1 is a blank to receive the description of the car, a photograph of the car and its owner, and the signature of the latter;

Fig. 2 is a blank to receive the data of the bill of sale of the car;

Fig. 3 is a blank form of certificate of title to include all matters of record affecting title to the car;

Fig. 3ª is a blank card to be issued to the owner of the car as an ancillary certificate of title and indicating his participation in the protective system included in the instant invention;

Fig. 4 is a blank to receive the data relating to the registration of the car;

Fig. 5 is a blank to receive the complete record of the insurance placed by the owner of the car, and the index of the secret identification marking;

Fig. 6 is a blank to receive the data of the car and the record of the secret marking.

Referring to Fig. 1, the numeral 1 indicates a card or sheet of paper having printed thereon the descriptive indicia of an automobile including name, type, year model, horsepower, etc., each index being followed by an appropriate space to receive the proper data to constitute a complete description of the car to be obtained by a personal inspection by the party issuing the instrumentalities constituting the instant invention, the section of the blank constituting this particular phase of the invention being designated by the numeral 2, and under the caption "Description." Below this descriptive section is a line 3 to receive the signature of the owner, below which is a line 4 for the signature of a witness on behalf of the issuing party. To the right of the description is a space to receive a photograph of the owner of the car. After all of the identifying data relative to the car has been supplied, the signatures attached, and the photograph applied in position, the official seal of the issuing party is preferably impressed in the blank so as to partly overlie the photograph, so as to prevent the removal of or tampering with the photograph.

The co-ordination of the description of the car, the signatures, the photograph, and the seal, will furnish positive and indisputable evidence of the identity of the owner and the identity of the car, wherever the owner may be, and in the event that the record constituting the instant invention, usually carried by the owner of the car, may be lost or mislaid, an ancillary card or ticket 8, such as illustrated in Fig. 3ª, is furnished to the owner, said card constituting a certificate identifying the owner and the car and the number of the particular book constituting a record data, which book will be hereinafter referred to as the abstract. Preferably, the ancillary card 8 aforesaid also contains a blank space 9 for the signature of the owner, and a second blank space 9' for the signature of the agent or representative of the party issuing the abstract.

This identification card will enable the owner to make application through some authorized agency of the issuing party, police department, title company, insurance agency or the like, for complete information as to the title to the car and the secret marking on the latter to be hereinafter referred to, which may be furnished by mail or telegraph, and the owner's right to the car thereby established. This particular blank, represented by Sheet No. 1, when properly supplied with the requisite data and information, will serve to identify the owner of the car in other business transactions, and enable him to furnish accurate and dependable information to the proper authorities in case of theft of the car.

Fig. 2 represents a blank 6 constituting a memorandum of sale of the automobile, and when the necessary data has been supplied, this memorandum, together with the certificate of title illustrated by blank 7 in Fig. 3, constitutes an evidence of ownership certified to by the issuer of the abstract. The said certificate blank 7 is designed also to receive the data of any matters of record, such as chattel mortgage, bills of sale, laborers' liens, etc. This certificate, when completed, constitutes a guarantee of a complete and correct showing of such matters as are of record affecting the title to the particular motor vehicle identified on blank No. 1.

The blank shown in Fig. 4 designated by numeral 10, constitutes, when the necessary data is supplied, a complete registration record identifying the owner by name and residence, and the car by name, and various other identifying data, indicating the license number and the class to which the vehicle belongs. While this blank is not absolutely essential as an element of the system aforesaid, it nevertheless furnishes an effective check on the car and its owner, should the car be stolen, or should the owner be called upon to establish his title or right to the car through official agencies, such as the registration bureau of a city or State, the registration record blank gives all necessary information to check the data as to both the car and the owner in said registration bureau.

The blank 11 illustrated in Fig. 5 includes two sections, the first section 12 being a transcript of the insurance record in respect of the car and containing spaces for receiving all of the data as to the insurance placed by the owner on the motor vehicle, including policy numbers, insuring companies, dates of issue and expiration, and particular character of insurance. The second section 13 of the blank refers to a secret identification record, and includes a blank space 14, to receive the index of a secret identification marking placed on the car, which secret identification marking is recorded in the office of the party issuing the abstract, upon a record card or blank of the type illustrated in Fig. 6, the said blank 15 containing spaces to receive the data and spaces to be filled in by the inspector or other party who applies the secret marking, indicating the specific character of the marking and the location thereof. This secret marking may be of any arbitrary character, either in the form of a number or numbers, or symbols, which may be stamped or impressed by suitable dies at any selected place on the body of the car, and preferably also on the chassis, the particular location or locations of the marking being indicated on blank No. 15 by the inspector or party authorized to apply the secret marking. This record card 15 is kept in the confidential archives of the party issuing the abstract, and not even the owner of the car is apprised of the character or location of the secret marking until such time as it becomes absolutely necessary to make the same known, as for example, in the case of theft of the car, and the mutilation thereof, as for example, by changing the factory numbers on the car and the engine, or remodelling or repainting the car. This secret marking and the record thereof is of vital importance in case of theft of several cars of the same make in the same locality, as it will enable the owner of the car, or the proper authorities, to procure an immediate and authentic identification of the car by obtaining the necessary information from the party issuing the abstract as to the character and location of the secret markings.

From the foregoing description, it will be apparent that the system aforesaid, when put into effect by a competent and responsible party, will not only afford the owner of the car to whom the abstract is issued instant and indisputable evidence of his ownership, but will also provide readily available and authentic information for the police authorities to trace a car when the same has been stolen, and to identify the same even among a large number of cars of the same make. Likewise, the system will act as a deterrent to the theft of cars, as the latter could not be safely operated by the thief without detection, and would render the sale of stolen cars too difficult and hazardous to be undertaken with impunity.

What I claim is:

1. The combination of blanks having appropriately designated spaces to receive the description and identifying data of an automobile, the photograph of the car and the owner thereof; matters of record affecting title to the car; an index of secret identification marking placed on the car; and a record of the secret marking including the character and location thereof.

2. The combination of blanks having appropriately designated spaces to receive the description and identifying data of an automobile, the photograph of the car and the owner thereof; memoranda of the sale of the car; matters of record affecting title to the car; an index of secret identification marking placed on the car; and a record of the secret marking including the character and location thereof.

3. The combination of blanks having appropriately designated spaces to receive the description and identifying data of an automobile, the photograph of the car and the owner thereof; memoranda of the sale of the car; the record of registration of the car; matters of record affecting title to the car; an index of secret identification marking placed on the car; and a record of the secret marking including the character and location thereof.

4. The combination of blanks having appropriately designated spaces to receive the description and identifying data of an automobile, the photograph of the car and the owner thereof; memoranda of the sale of the car; the record of registration of the car; the record data of the insurance including the character and duration thereof and the name or names of the insurers; matters of record affecting title to the car; an index of secret identification marking placed on the car; and a record of the secret marking including the character and location thereof.

In testimony whereof I affix my signature.

LEWIS D. FOX.